US012207728B2

(12) United States Patent
Fela

(10) Patent No.: US 12,207,728 B2
(45) Date of Patent: Jan. 28, 2025

(54) PAINTBRUSH CLEANER

(71) Applicant: Deborah Fela, Poughkeepsie, NY (US)

(72) Inventor: Deborah Fela, Poughkeepsie, NY (US)

( * ) Notice: Subject to any disclaimer, the term of this patent is extended or adjusted under 35 U.S.C. 154(b) by 0 days.

(21) Appl. No.: 18/744,639

(22) Filed: Jun. 16, 2024

(65) Prior Publication Data

US 2024/0335028 A1 Oct. 10, 2024

Related U.S. Application Data

(63) Continuation of application No. 18/305,658, filed on Apr. 24, 2023, now Pat. No. 12,035,802, which is a continuation of application No. 17/713,589, filed on Apr. 5, 2022, now Pat. No. 11,672,330.

(51) Int. Cl.
*A46B 17/06* (2006.01)
*B44D 3/00* (2006.01)

(52) U.S. Cl.
CPC .............. *A46B 17/06* (2013.01); *B44D 3/006* (2013.01)

(58) Field of Classification Search
CPC ...... A46B 17/06; A46B 17/065; B44D 3/006; B08B 3/08
See application file for complete search history.

(56) References Cited

U.S. PATENT DOCUMENTS 4,771,501 A 9/1988 Leiter
6,067,688 A * 5/2000 West .................... A47L 23/263 15/311
6,666,925 B2 12/2003 Brackett et al.
8,938,843 B2 1/2015 Junkins
9,596,927 B1 3/2017 Dasilva
9,821,336 B2 11/2017 Kellokoski et al.
11,672,330 B1 6/2023 Fela
12,035,802 B2 7/2024 Fela
2015/0296973 A1 10/2015 Leiker
2018/0368568 A1* 12/2018 Lee ........................ A46B 17/06
(Continued)

FOREIGN PATENT DOCUMENTS

DE 202006015470 U1 2/2007
DE 202007002821 U1 6/2007
(Continued)

OTHER PUBLICATIONS

International Search Report, International App No. PCT/US 23/66067, Applicant: Fela, Deborah, Mail date: Aug. 23, 2023, 3 pages.
(Continued)

*Primary Examiner* — Shay Karls
(74) *Attorney, Agent, or Firm* — Salle Ackerman LLC; Stephen B. Ackerman; Rosemary L. S. Pike

(57) ABSTRACT

A method for cleaning a paintbrush is described. A paintbrush cleaning device is provided comprising a concave soap tray having a cleaning brush at one end within the soap tray. The paintbrush is rinsed under running water until most paint is removed from the paintbrush. The paintbrush cleaning device is held in one hand and the paintbrush is held in the other hand. The following steps are repeated until the paintbrush is clean: the paintbrush is swirled on soap in the soap tray and the paintbrush is run through the cleaning brush. Once the paintbrush is clean, it is rinsed and dried.

20 Claims, 5 Drawing Sheets

(56) References Cited

U.S. PATENT DOCUMENTS

2021/0321759 A1 10/2021 Altschuler

FOREIGN PATENT DOCUMENTS

| | | |
|---|---|---|
| DE | 10 2016 100 597 A1 | 7/2017 |
| KR | 101084626 B1 | 11/2011 |

OTHER PUBLICATIONS

PCT Written Opinion, International Application No. PCT/US 23/66067, Applicant: Fela, Deborah, Mail date: Aug. 23, 2023,5 pages.

"Ryobi Paint Brush Cleaner," by Dusty Overby, Feb. 11, 2010, pp. 1-5, found: https://www.gearpatrol.com/home/a19373/ryobi-paint-brush-cleaner/.

U.S. Office Action, U.S. Appl. No. 17/713,589, Applicant: Deborah Fela, Mail date: Jun. 29, 2022, 12 pages.

U.S. Office Action, U.S. Appl. No. 17/713,589, Applicant: Deborah Fela, Mail date: Oct. 13, 2022, 8 pages.

U.S. Notice of Allowance, U.S. Appl. No. 17/713,589, Applicant: Deborah Fela, Mail date: Feb. 7, 2023, 7 pages.

U.S. Office Action, U.S. Appl. No. 18/305,658, Applicant: Deborah Fela, Mail date: Oct. 16, 2023, 12 pages.

U.S. Office Action, U.S. Appl. No. 18/305,658, Applicant: Deborah Fela, Mail date: Jun. 7, 2023, 9 pages.

U.S. Notice of Allowance, U.S. Appl. No. 18/305,658, Applicant: Deborah Fela, Mail date: Mar. 11, 2024, 9 pages.

* cited by examiner

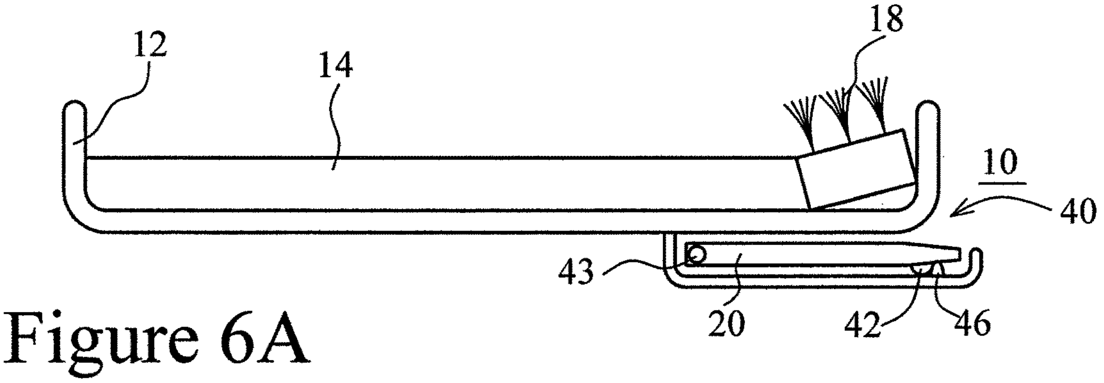
Figure 6A
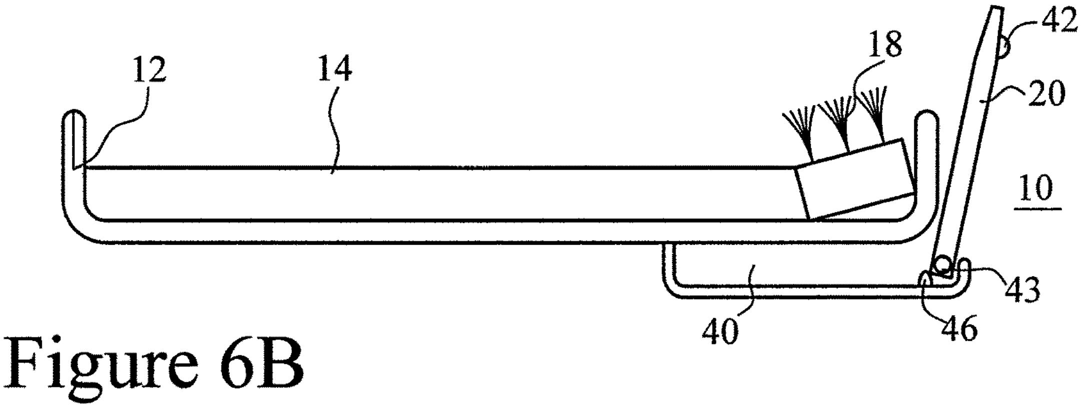
Figure 6B
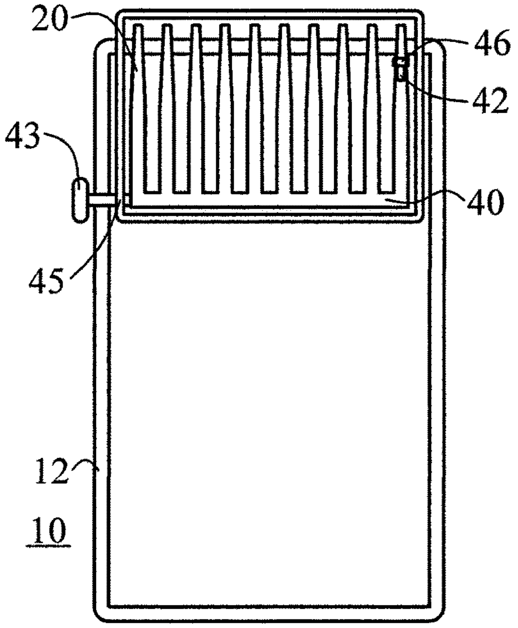
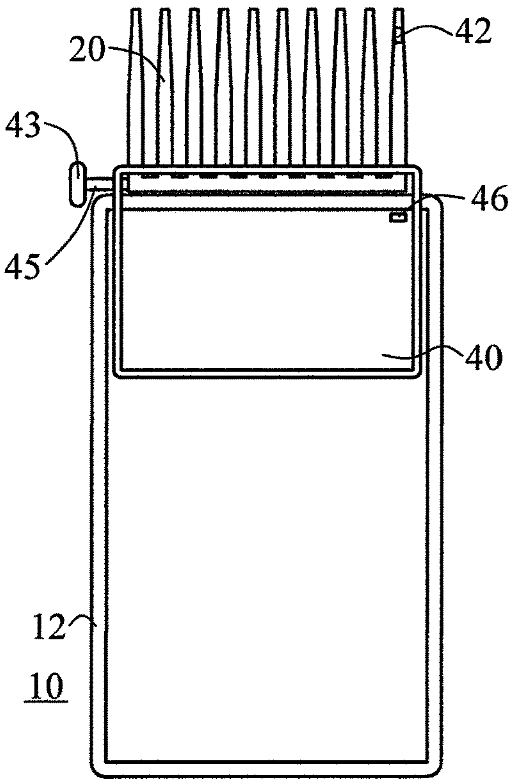
Figure 7A
Figure 7B

PAINTBRUSH CLEANER

This application is a continuation application of Ser. No. 18/305,658, filed on Apr. 24, 2023, which is a continuation of Ser. No. 17/713,589, filed on Apr. 5, 2022, now U.S. Pat. No. 11,672,330, both assigned to a common assignee, and herein incorporated by reference in their entirety.

(1) TECHNICAL FIELD

This disclosure relates to a device for cleaning a paintbrush, and more particularly, to a self-contained device for cleaning a paintbrush.

(2) BACKGROUND

Not thoroughly cleaning a paintbrush after using it for painting will result in a bad paintbrush which can lead to uneven crisp edges. A bad paintbrush can also result in unwanted visible brush strokes. A typical process of cleaning a paintbrush is:

1. Rinse the paintbrush in a sink under running water until most paint is removed and the water is mostly clear.
2. Wet a bar of cleaning soap and hold it in one hand with your paintbrush in the other hand. Alternating sides of the paintbrush, gently lather the paintbrush bristles below the ferrule. Use your hands to work the lather into the bristles. Often this process and/or the soap can be harsh on your hands. The bar of soap can be slippery and difficult to hold.
3. Hold the paintbrush by the handle in one hand and hold a wire brush in the other hand, stroking the wire brush gently through the paintbrush bristles going in the direction away from the ferrule of the paintbrush toward the tapered tip end of the paintbrush. Remove any stubborn residual paint with the wire brush. The paintbrush can be slippery from the soap, the process may result in splattering, and these steps may need to be repeated several times. It is necessary to support the paintbrush while using the wire brush. Supporting the paintbrush on your hand can result in painful wire scratching to your hand. An alternative would be supporting the paintbrush on the sink base which causes scratches to the sink.
4. Another cleaning tool such as a paintbrush comb may be required to remove deeper internal residual paint from the inner part of the bristles which would repeat the #3 process.
5. Lastly rinse the paintbrush thoroughly with clear water and dry by your preferred method of drying by either swirling, blotting, etc. Let the brush dry overnight by hanging from the handle with bristles pointing downwards.

Several U.S. Patents describe powered or manual tools to clean paintbrushes including U.S. Pat. No. 6,666,925 (Brackett), U.S. Pat. No. 9,821,336 (Kellokoski et al), U.S. Pat. No. 9,595,927 (Dasilra), and U.S. Pat. No. 8,938,843 (Junkins).

SUMMARY

A principal objective of the present disclosure is to simplify and enhance the process of cleaning a paintbrush to protect and preserve the paintbrush investment.

Another objective of the present disclosure is to provide an apparatus and process for thoroughly cleaning a paintbrush while minimally getting one's hands wet and protecting one's skin.

Another objective of the present disclosure is to provide an apparatus and process for thoroughly cleaning a paintbrush while saving time and protecting one's skin and surroundings.

In accordance with the objectives of the disclosure, a paintbrush cleaning device is achieved. The paintbrush cleaning device comprises a concave soap tray having a cleaning brush at one end within the soap tray wherein the soap tray is configured to hold a soap for cleaning a paintbrush and wherein the cleaning brush is configured to scrape paint from bristles of the paintbrush.

Also in accordance with the objectives of the disclosure, a paintbrush cleaning device is achieved. The paintbrush cleaning device comprises a concave soap tray having a cleaning brush and a cleaning comb at one end within the soap tray wherein the soap tray is configured to hold a soap for cleaning a paintbrush and wherein the cleaning brush and comb are configured to scrape paint from bristles of the paintbrush.

Also in accordance with the objectives of the disclosure, a method for cleaning a paintbrush is achieved. A paintbrush cleaning device is provided comprising a concave soap tray having a cleaning brush at one end within the soap tray. The paintbrush is rinsed under running water until most paint is removed from the paintbrush. The paintbrush cleaning device is held in one hand and the paintbrush is held in the other hand. The following steps are repeated until the paintbrush is clean: the paintbrush is swirled on the soap and the paintbrush is run through the cleaning brush. Once the paintbrush is clean, it is rinsed and dried.

BRIEF DESCRIPTION OF THE DRAWINGS

In the accompanying drawings forming a material part of this description, there is shown:

FIGS. 6A and 6B are side views of the paintbrush cleaning device with an optional slidable cleaning comb in one embodiment of the present disclosure.

FIGS. 7A and 7B are bottom views of the paintbrush cleaning device with the optional slidable cleaning comb in one embodiment of the present disclosure.

DETAILED DESCRIPTION

The present disclosure provides a paintbrush cleaning apparatus and method designed to simplify and enhance the process of cleaning a paintbrush to protect and preserve the paintbrush investment, save time, and protect a user's hands. The paintbrush cleaning device of the present disclosure is a self-contained container consisting of conditioning soap with a cleaning brush and, optionally, a cleaning comb on one edge of the container. This device is useful for cleaning a paintbrush used with water-based paints.

After rinsing excess paint from the paintbrush, while the paintbrush is still wet, the user will work the paintbrush into the soap in the soap tray and gently drag the paintbrush through the brush/comb edge for a thorough cleaning. This simple cleaning process protects the paintbrush and a user's hands while saving time. This process allows a user to minimally wet the user's hands while thoroughly cleaning the paintbrush. After the paintbrush is cleaned, the user simply rinses the soap tray and brush and it is ready for the next use.

Figure 1:
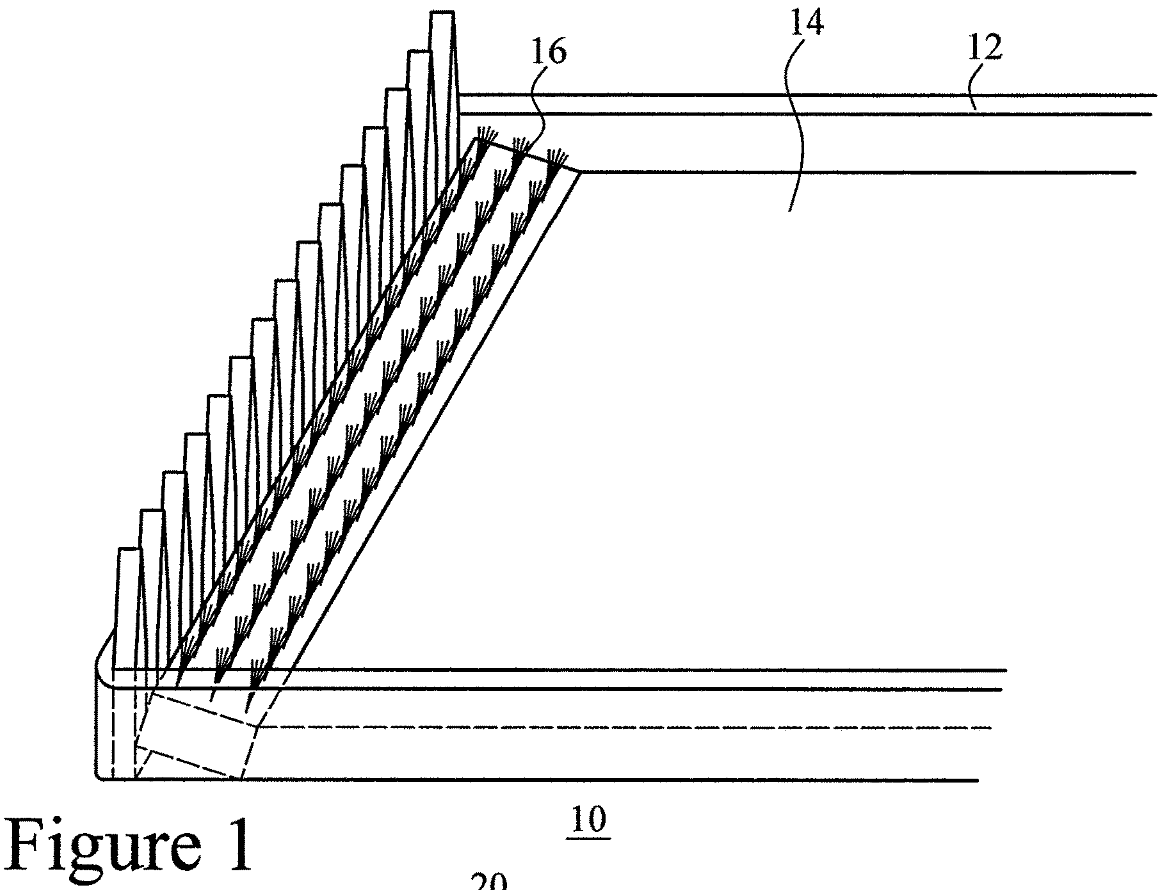
FIGS. 1-3 are top views of alternative configurations of a paintbrush cleaning device in a preferred embodiment of the present disclosure.

FIG. 1 illustrates an exemplary paintbrush cleaning device 10 according to the present disclosure. The device consists of a concave container 12 that is configured to hold a solid conditioning soap 14. At one end of the container is fixed a combination cleaning brush and, optionally, a cleaning comb 16.

For example, the soap 14 in the soap container may contain the following ingredients: 12 Propylene Glycol, Water, (Aqua/Eau), Sorbitol, Sodium Stearate, Sodium Laureth Sulfate, Sodium Myristate, Glycerin, Sodium Laurate, Triethanolamine, Goat Milk, (Caprae Lac/Lait de Chevre), and Titanium Dioxide. The soap may contain any appropriate ingredients so that it is solid at room temperature. Preferably it will include a conditioning agent, such as goat's milk.

Figure 4:
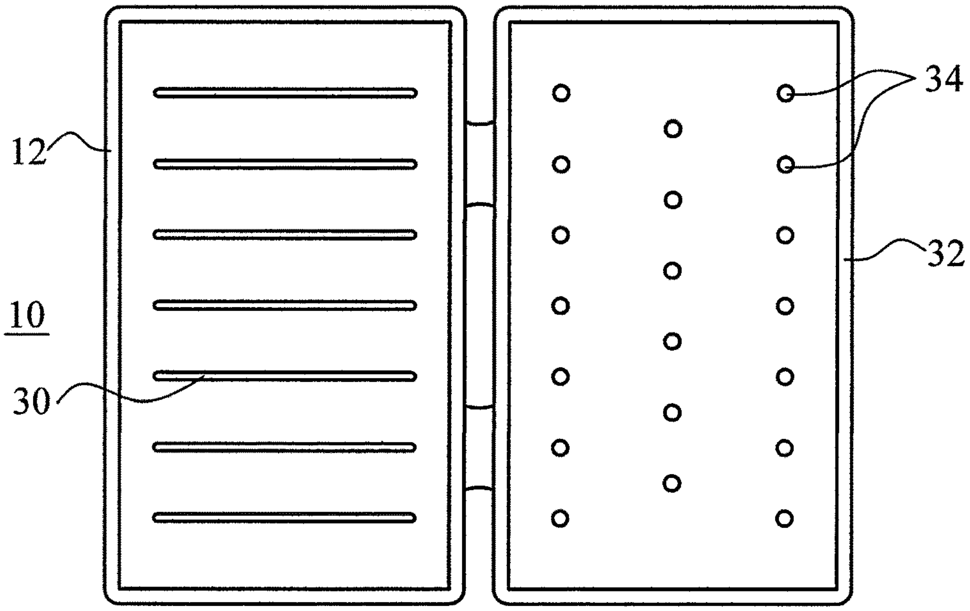
FIG. 4 is a top view of the paintbrush cleaning device with an optional cover in the preferred embodiment of the present disclosure.

In a preferred method of the disclosure, the soap is prepared in a liquid state and poured into the container 12, solidifying after it is put into the container. Since the soap is in a solid state, it can be easily reused. The container 12 is preferably about 1-1.5 inches deep. The inner surface of the container bottom 12 could be flat, or optionally, as shown in FIG. 4, it could have points or ribs 30 raised up from the floor of the container 12 to better hold the soap in place. In this embodiment, once the soap wears down and the ribs or points are showing, they may provide some additional cleaning capability.

Also shown in FIG. 4 is an optional cover 32 that can be snapped on or hinged to the bottom portion 12. The cover optionally has air holes 34 so that the enclosed soap can air dry. The cover preferably does not rest snugly against the soap, but is raised so that it closes over the brush and (optional) comb. The entire length of the cover could be raised, or it could just be raised over where the brush and/or comb are located.

Referring again to FIG. 1, the preferred cleaning brush and comb combination 16 is preferably attached to the container, such as by gluing or other attachment means, as well as being embedded in the soap. Optionally, the cleaning brush/comb could be merely embedded in the soap without being attached to the container. The cleaning brush/comb extends the length of the container side, as shown. Preferably, the brush portion is tilted at about 45 degrees in the direction from which the brush is to be swiped while the comb portion is preferably vertical. Alternatively, the brush portion could be tilted at other angles from somewhat greater than 45 degrees to 0 degrees (i.e., having a vertical orientation).

Figure 2:
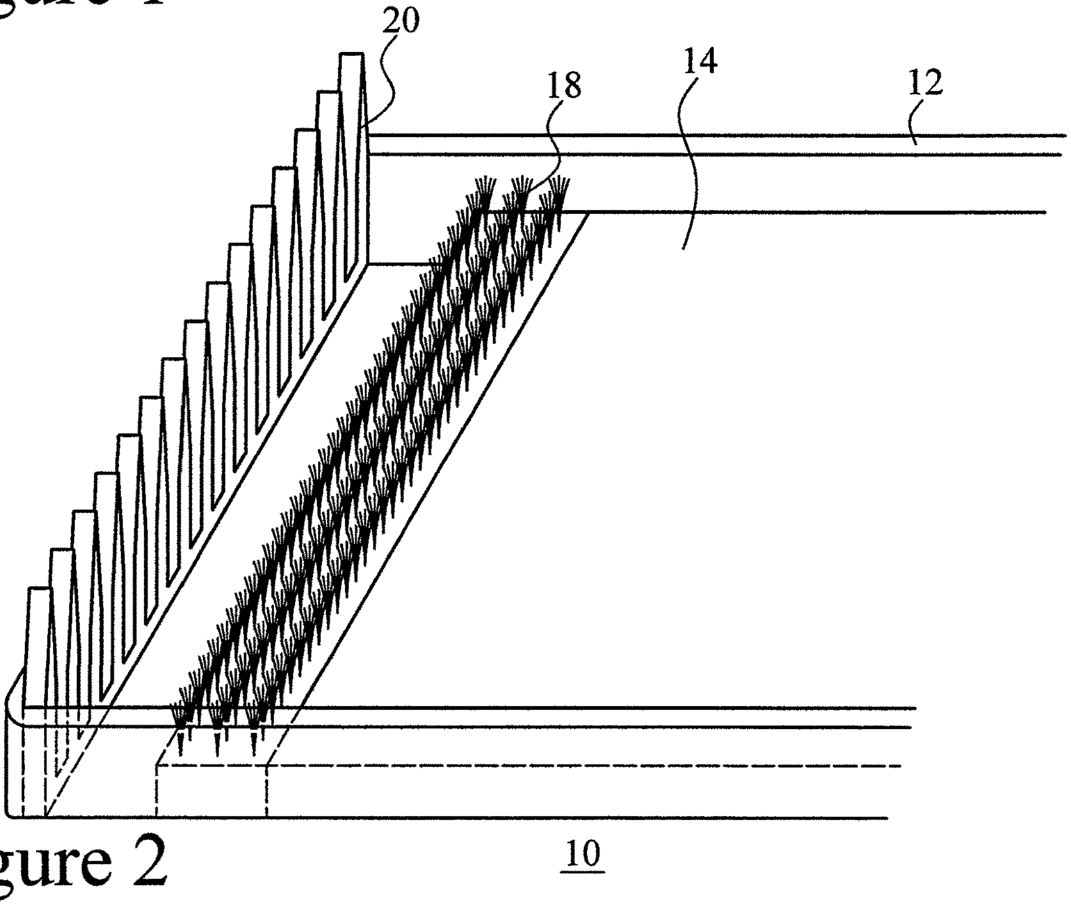
Figure 3:
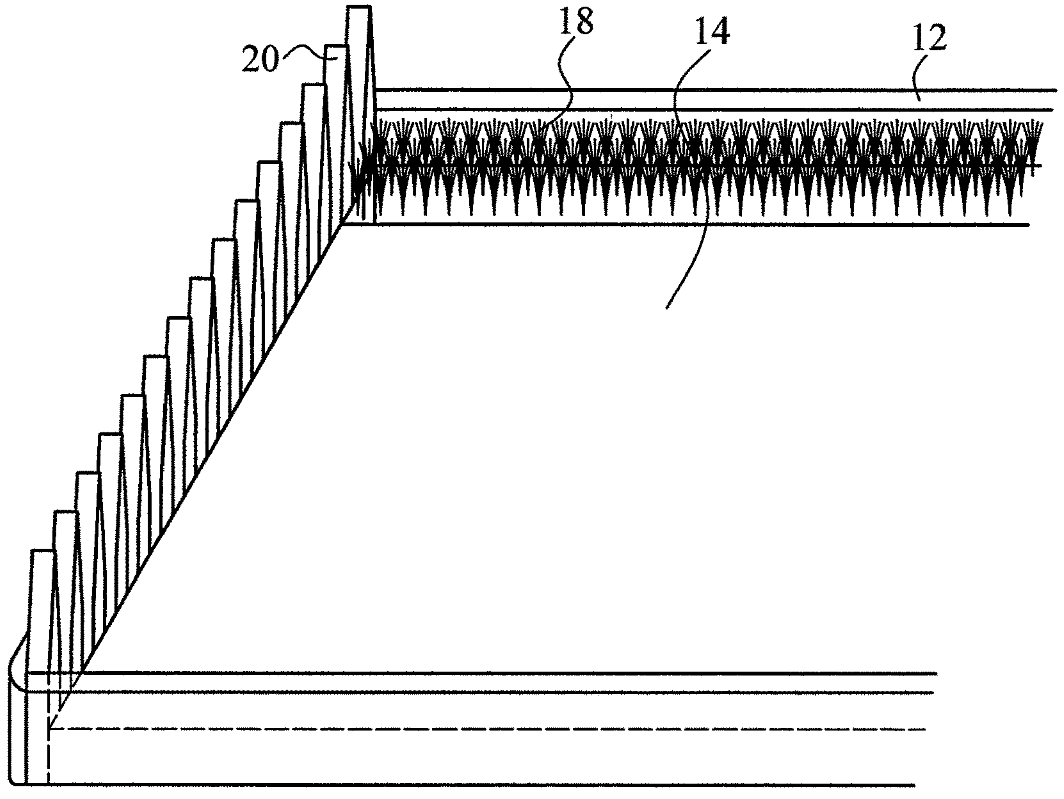

The paintbrush cleaning device of the present disclosure could have different variations. For example, as shown in FIG. 2, a cleaning brush 18 is fixed to one end of the soap tray and an additional comb-like structure 20 is located behind the brush 18. In FIGS. 2 and 3, cleaning brush 18 is shown in an alternative, vertical orientation, but could be angled as shown in FIG. 1.

FIG. 3 illustrates an example where the brush 18 and comb 20 are located orthogonal to each other. Alternately, one of the cleaning brush 18 and cleaning comb 20 could be located at one end of the soap tray 12, and the other at the opposite end.

The brush and/or comb could be made with hard plastic, wire, or metal. Preferably, the cleaning brush has metal bristles and the cleaning comb has metal tines.

FIGS. 5-7 illustrate alternative configurations where a cleaning comb is slidably and/or rotatably mounted on the outside of the container. This alternative is intended to prevent a user from the possibility of being injured by the sharp tines of the cleaning comb. In this alternative, when the apparatus is in storage, the cleaning comb is stored within a sheath 40 on the underside of the container 12.

Figure 5A:
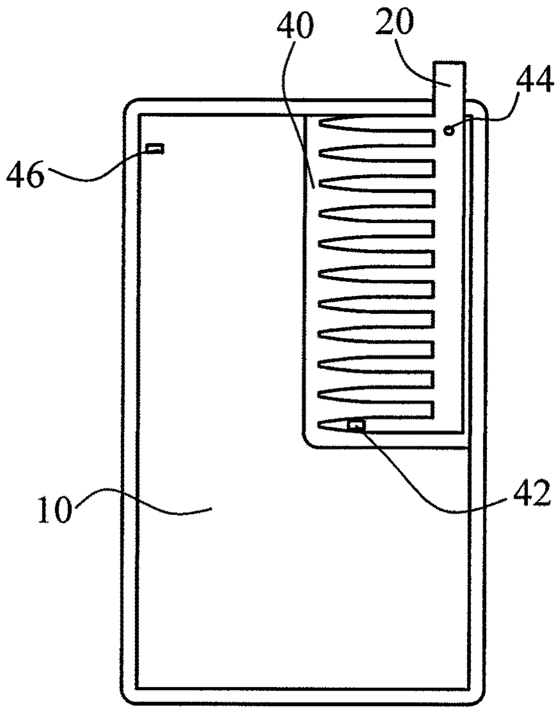
FIGS. 5A and 5B are bottom views of the paintbrush cleaning device with an optional rotatable cleaning comb in one embodiment of the present disclosure.
Figure 5B:
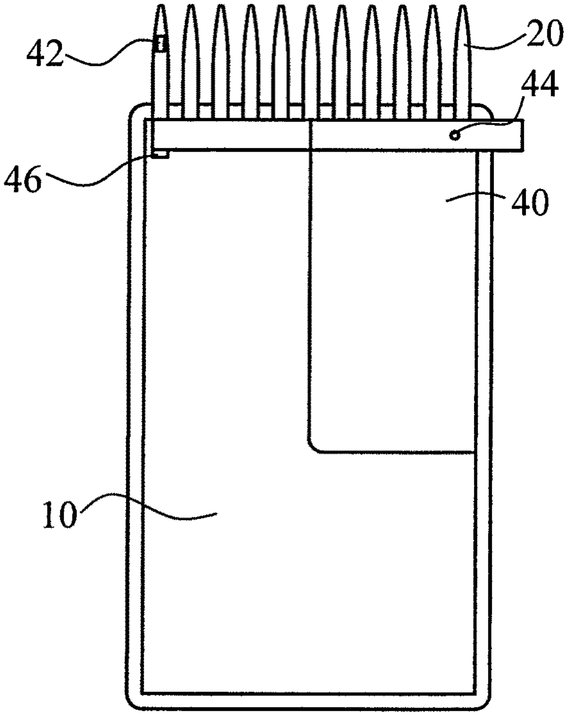
Figure 5C:
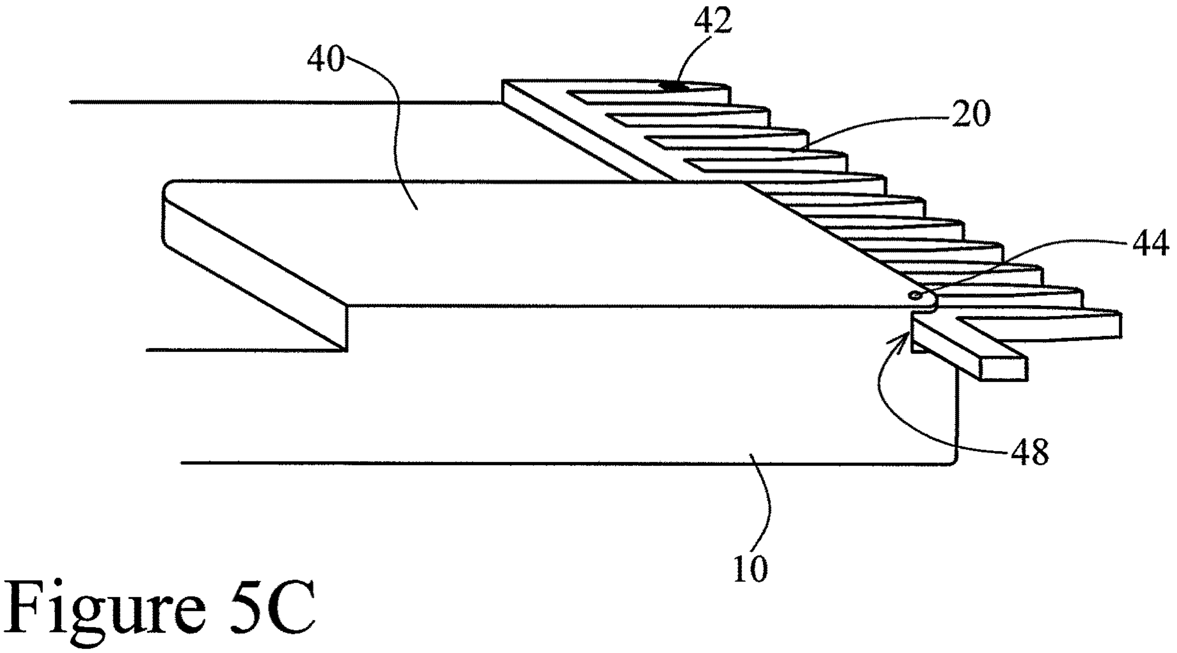
FIG. 5C is a side view of the paintbrush cleaning device with the optional rotatable cleaning comb in one embodiment of the present disclosure.

One example alternative is illustrated in FIGS. 5A-C. FIGS. 5A and 5B show an underside view of the paintbrush cleaning apparatus 10. In FIG. 5A, the cleaning comb 20 is shown within the sheath 40. It is pivotably attached to the underside of the apparatus by a rivet 44, for example. The comb is held in place within the sheath 40 by knob 42, for example, that is pressed against the upper side of the sheath 40. In FIG. 5B, the cleaning comb 20 has been pivoted 90° out of the sheath 40, traveling over the knob 46, for example, which will lock it in place in the extended position. FIG. 5C is a side view of the apparatus showing the cleaning comb 20 extended. The cut-out edge 48 of the sheath 40 could act as a stop for extending the comb.

Another example alternative is illustrated in FIGS. 6 and 7. FIGS. 6A and 6B show a side view of the paintbrush cleaning apparatus 10. In FIG. 6A, the cleaning comb 20 is shown within the sheath 40. The comb is held in place within the sheath 40 by knob 42, for example, that is pressed against a knob, 46, for example, on the floor of the sheath 40. In FIG. 6B, the cleaning comb 20 has been slid out of the sheath 40 and rotated approximately 90° so that the tines of the cleaning comb 20 point up vertically behind the cleaning brush 18. Button 43 controls the sliding and rotation of the comb. The shaft 45 of the cleaning comb can slide along a channel along one side of the sheath, traveling over the knob 46, which will lock it in place in the extended position. The tines of the cleaning comb 20 may point out horizontally as in the first alternative shown in FIGS. 5B and 5C. Optionally, the extended cleaning comb may be rotated using the button 43 so that the tines point approximately vertically upward as shown in FIG. 6B. The button 43 would also provide a locking mechanism for keeping the comb pointing vertically upward. FIGS. 7A and 7B illustrate the underside of the paintbrush cleaning apparatus 10. FIG. 7A shows the cleaning comb 20 stored within the sheath 40. FIG. 7B shows the cleaning comb slid out of the sheath 40 but not yet rotated into the vertical position.

Figure 8:
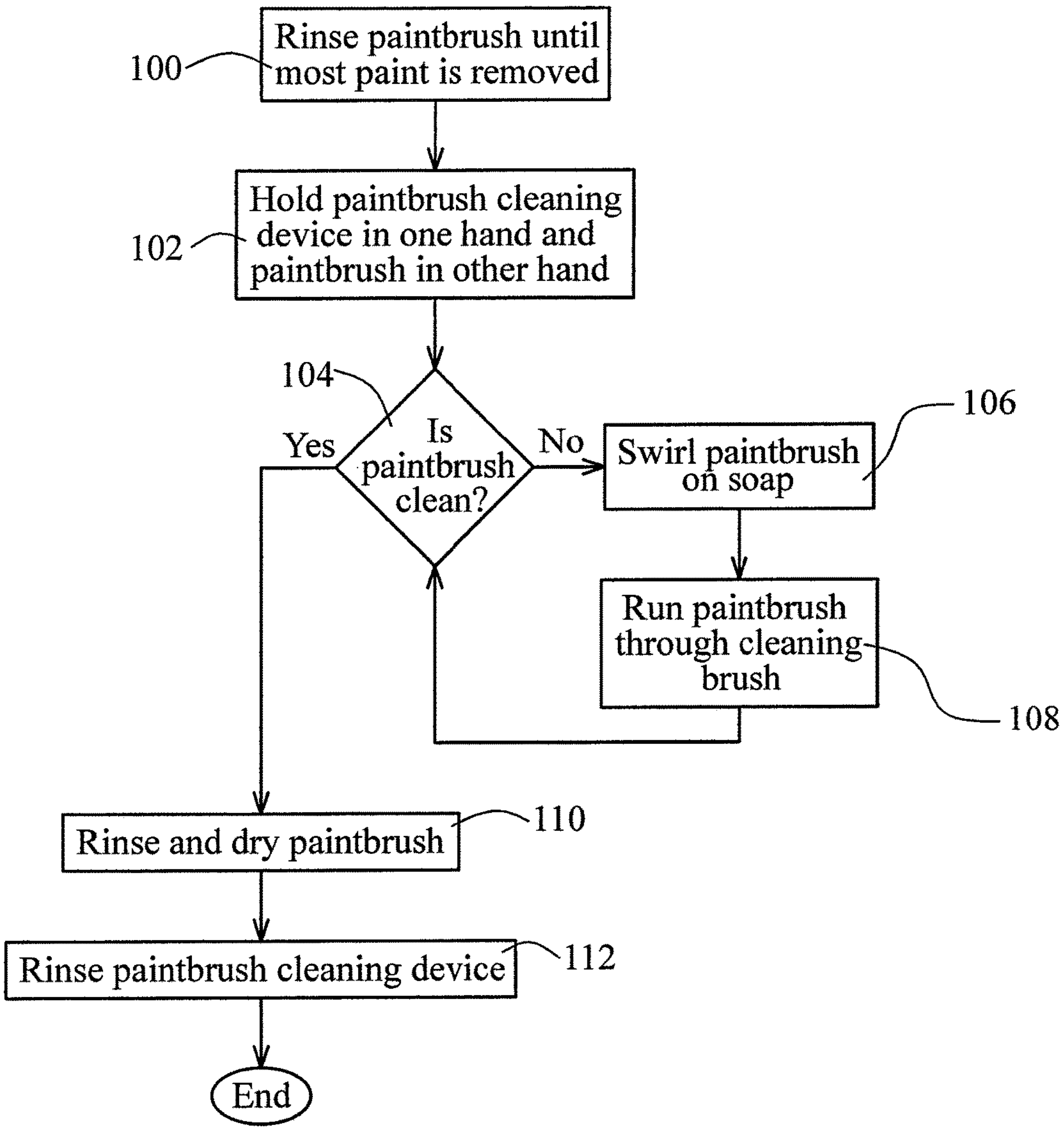
FIG. 8 is a flowchart of an exemplary process of using the paintbrush cleaning device in a preferred embodiment of the present disclosure.

The paintbrush cleaning device 10 dramatically simplifies the process of cleaning a paintbrush and preserving the paintbrush investment as well as the user's hands. FIG. 8 is a flow chart detailing the steps required to clean a paintbrush using the paintbrush cleaning device 10 of the present disclosure.

First, in step 100, rinse your paintbrush in a sink under running water until most of the paint is removed and the water is mostly clear.

In step 102, hold the paintbrush cleaning device 10 in one hand and the paintbrush in the other hand. While the paintbrush is not yet clean (104), repeat the steps of (106) swirling the already wet paintbrush about on the soap 14 within the container 12, then (108) running the paintbrush through the cleaning brush 16 or 18, and optionally the cleaning comb 16 or 20, as needed.

In step 110, rinse and dry the paintbrush. Hands have no need to touch the soap or water. Finally, in step 112, rinse the paintbrush cleaning device 10 after which it is available for reuse.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter and the appended claims.

What is claimed is:

1. A method for cleaning a paintbrush comprising:
providing a paintbrush cleaning device comprising:
a concave soap tray configured to receive a soap for cleaning a paintbrush; and
a cleaning brush having metal bristles and attached along one edge of said soap tray and extending along a length of said edge of said soap tray;
adding a liquid soap to said soap tray and thereafter solidifying said liquid soap to form a solid soap;
rinsing said paintbrush under running water until most paint is removed from said paintbrush;
thereafter holding said paintbrush cleaning device in one hand and said paintbrush in the other hand;
thereafter repeating until said paintbrush is clean the steps of:
swirling said paintbrush on said solid soap; and
running said paintbrush through said cleaning brush; and
thereafter rinsing and drying said paintbrush.

2. The method according to claim 1 further comprising: rinsing said paintbrush cleaning device after said paintbrush is clean.

3. The method according to claim 1 wherein said paintbrush cleaning device further comprises a cleaning comb configured to slidably be stored within a sheath on an underside of said soap tray and further comprising:
preparing said paintbrush cleaning device for use by sliding said cleaning comb out of said sheath and rotating said cleaning comb 90° so that said cleaning comb points up vertically on an edge of said soap tray.

4. The method according to claim 1 wherein said paintbrush cleaning device further comprises a cleaning comb configured to rotatably be stored within a sheath on an underside of said soap tray and further comprising:
preparing said paintbrush cleaning device for use by rotating said cleaning comb out of said sheath so that said cleaning comb extends outwardly from an edge of said soap tray.

5. The method according to claim 1 wherein said cleaning brush is configured to be embedded in said solid soap.

6. The method according to claim 1 further comprising a cleaning comb located behind said cleaning brush.

7. The method according to claim 1 further comprising a cleaning comb located at an opposite edge of said soap tray from said cleaning brush.

8. The method according to claim 1 further comprising a cleaning comb located orthogonal to said cleaning brush.

9. The method according to claim 1 further comprising a cover configured to fit over said soap tray and said cleaning brush.

10. A method for cleaning a paintbrush comprising:
providing a paintbrush cleaning device comprising:
a concave soap tray;
a solid soap in said soap tray for cleaning a paintbrush; and
a cleaning brush at one end of said soap tray embedded in said solid soap;
rinsing said paintbrush under running water until most paint is removed from said paintbrush;
thereafter holding said paintbrush cleaning device in one hand and said paintbrush in the other hand;
thereafter repeating until said paintbrush is clean the steps of:
swirling said paintbrush on said solid soap; and
running said paintbrush through said cleaning brush; and
thereafter rinsing and drying said paintbrush.

11. The method according to claim 10 further comprising: rinsing said paintbrush cleaning device after said paintbrush is clean.

12. The method according to claim 10 wherein said paintbrush cleaning device further comprises a cleaning comb configured to slidably be stored within a sheath on an underside of said soap tray and further comprising:
preparing said paintbrush cleaning device for use by sliding said cleaning comb out of said sheath and rotating said cleaning comb 90° so that said cleaning comb points up vertically on an edge of said soap tray.

13. The method according to claim 10 wherein said paintbrush cleaning device further comprises a cleaning comb configured to rotatably be stored within a sheath on an underside of said soap tray and further comprising:
preparing said paintbrush cleaning device for use by rotating said cleaning comb out of said sheath so that said cleaning comb extends outwardly from an edge of said soap tray.

14. The method according to claim 10 further comprising a cleaning comb located behind said cleaning brush.

15. The method according to claim 10 further comprising a cover configured to fit over said soap tray and said cleaning brush.

16. The method according to claim 15 further comprising air holes in said cover configured to allow said soap to air dry.

17. The method according to claim 10 wherein said soap tray has raised ridges or points on its bottom surface underneath said soap and further comprising running said paintbrush over said raised ridges or points to further remove paint from said paintbrush.

18. A method for cleaning a paintbrush comprising:
providing a paintbrush cleaning device comprising:
a concave soap tray configured to receive a soap for cleaning a paintbrush; and
a cleaning brush having metal bristles and a cleaning comb having metal tines along one edge within said soap tray and extending along a length of said edge of said soap tray;
adding a liquid soap to said soap tray and thereafter solidifying said liquid soap to form a solid soap;
rinsing said paintbrush under running water until most paint is removed from said paintbrush;
thereafter holding said paintbrush cleaning device in one hand and said paintbrush in the other hand;
thereafter repeating until said paintbrush is clean the steps of:
swirling said paintbrush on said solid soap; and
running said paintbrush through said cleaning brush; and
thereafter rinsing and drying said paintbrush.

19. The method according to claim 18 further comprising:
rinsing said paintbrush cleaning device after said paintbrush is clean.

20. The method according to claim 18 wherein said cleaning brush is configured to be embedded in said solid soap.

* * * * *